United States Patent [19]

Dent

[11] Patent Number: 5,579,306
[45] Date of Patent: Nov. 26, 1996

[54] TIME AND FREQUENCY SLOT ALLOCATION SYSTEM AND METHOD

[75] Inventor: Paul W. Dent, Stehags, Sweden

[73] Assignee: Ericsson Inc., Research Triangle Park, N.C.

[21] Appl. No.: 299,255

[22] Filed: Sep. 1, 1994

[51] Int. Cl.[6] .................................. H04Q 7/00; H04J 3/16
[52] U.S. Cl. .......................... 370/50; 375/200; 455/38.3; 455/54.1; 455/68; 370/95.1
[58] Field of Search .......................... 370/50, 95.1, 95.3, 370/69.1, 76, 85.7; 455/33.1, 54.1, 68, 69, 34.1, 34.2, 54.2, 38.3, 67.1, 67.6; 375/200, 202, 203

[56] References Cited

U.S. PATENT DOCUMENTS

| | | | |
|---|---|---|---|
| 4,866,710 | 9/1989 | Schaeffer | 370/95.1 |
| 4,905,235 | 2/1990 | Saburi | 370/95.3 |
| 4,993,022 | 2/1991 | Kondo et al. | 370/79 |
| 5,038,399 | 8/1991 | Bruckert | 455/33 |
| 5,040,238 | 8/1991 | Comroe | 455/33 |
| 5,081,704 | 1/1992 | Umeda et al. | 455/33 |
| 5,134,709 | 7/1992 | Bi et al. | 455/33.1 |
| 5,210,771 | 5/1993 | Schaeffer et al. | 375/200 |
| 5,212,831 | 5/1993 | Chuang et al. | 455/54.1 |
| 5,241,690 | 8/1993 | Larsson et al. | 455/54.1 |
| 5,345,598 | 9/1994 | Dent | 455/54.1 |

FOREIGN PATENT DOCUMENTS

| | | |
|---|---|---|
| 0329997 | 8/1989 | European Pat. Off. . |
| 411878 | 2/1991 | European Pat. Off. . |
| 5-048521 | 2/1993 | Japan . |
| 5-145477 | 6/1993 | Japan . |
| 9004293 | 4/1990 | WIPO .................... 455/33.1 |

*Primary Examiner*—Alpus H. Hsu
*Assistant Examiner*—Ricky Q. Ngo
*Attorney, Agent, or Firm*—Burns, Doane, Swecker & Mathis, L.L.P.

[57] ABSTRACT

Radio communication systems employing time division multiple access (TDMA) on several frequency channels are disclosed. The base station transmitting powers can be reduced when communicating with nearby mobile stations while still permitting the base station to employ a constant transmitting power in all time slots. This can be accomplished by, for example, grouping mobile stations having similar transmit power requirements together and allocating such groups to time slots on a same frequency. In this way, the base station can transmit at a constant power for each time slot on a frequency and provide acceptable communication quality, but without unnecessarily wasting base station transmitter power by transmitting to mobile stations having widely divergent power requirements.

22 Claims, 4 Drawing Sheets

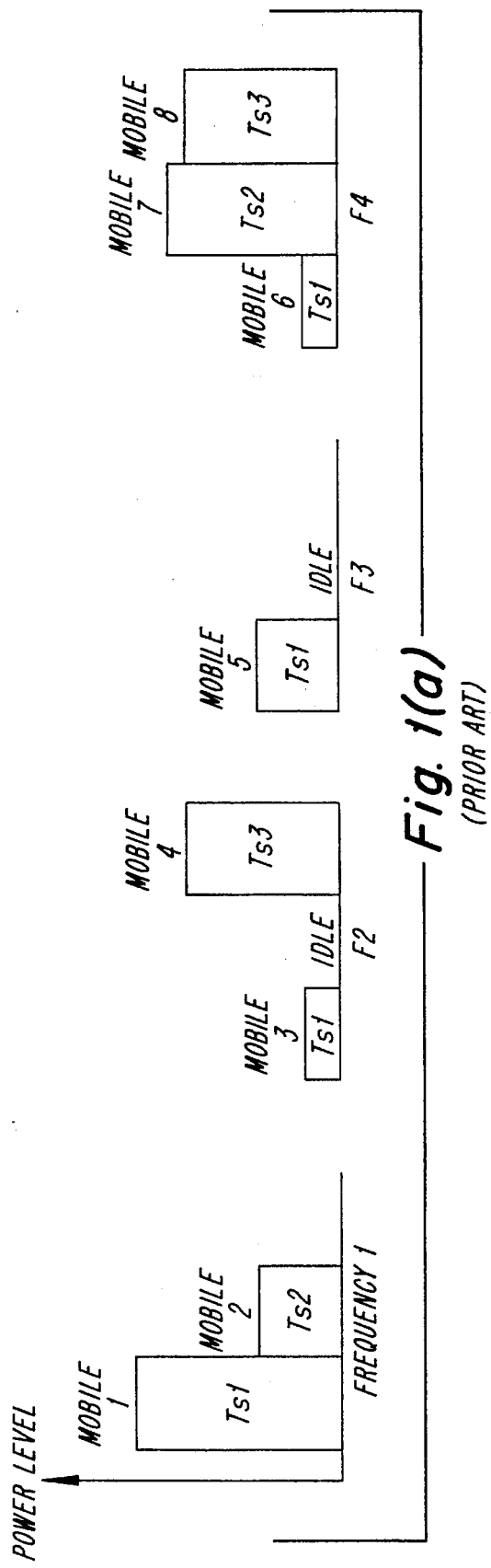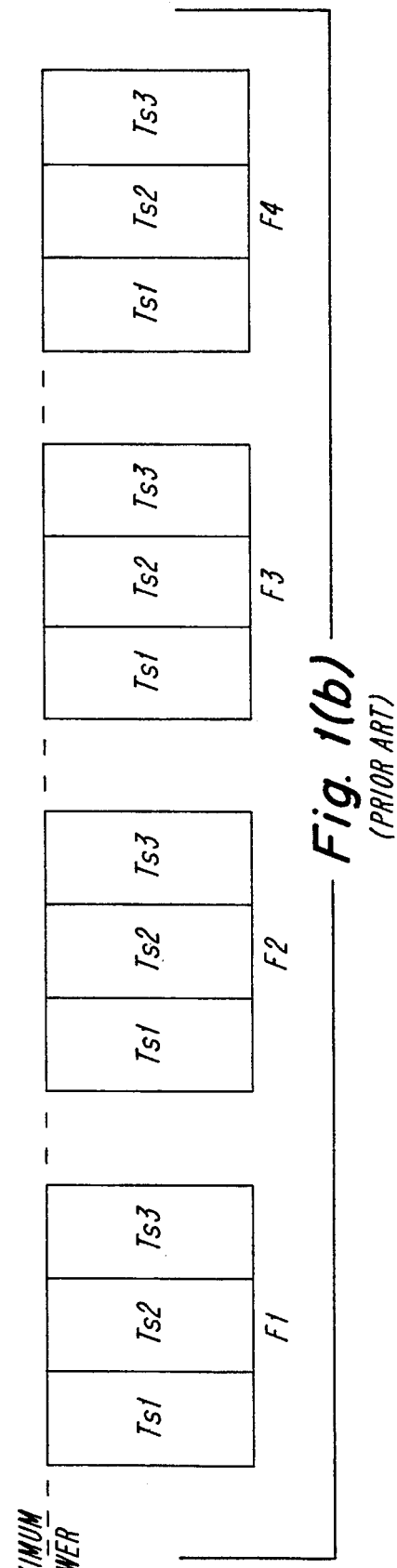

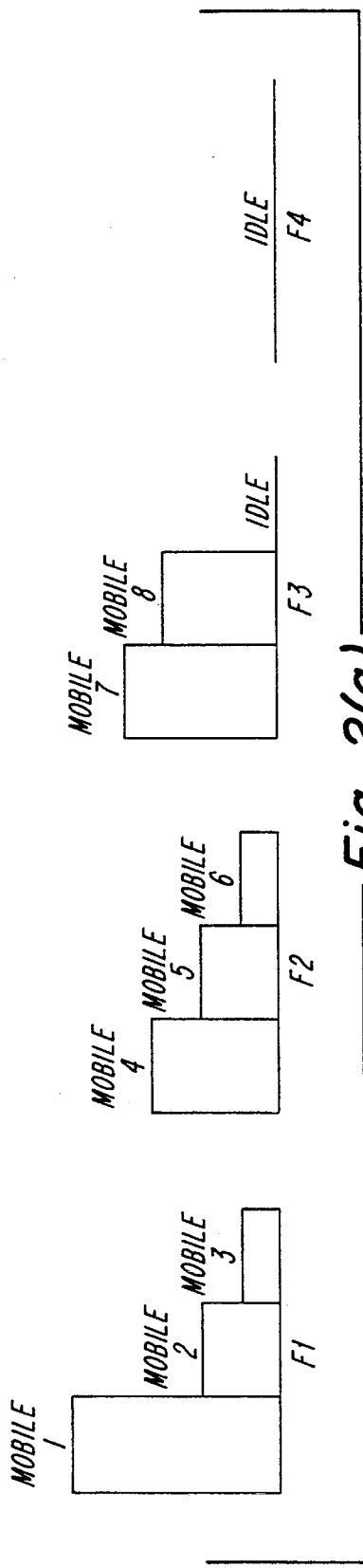
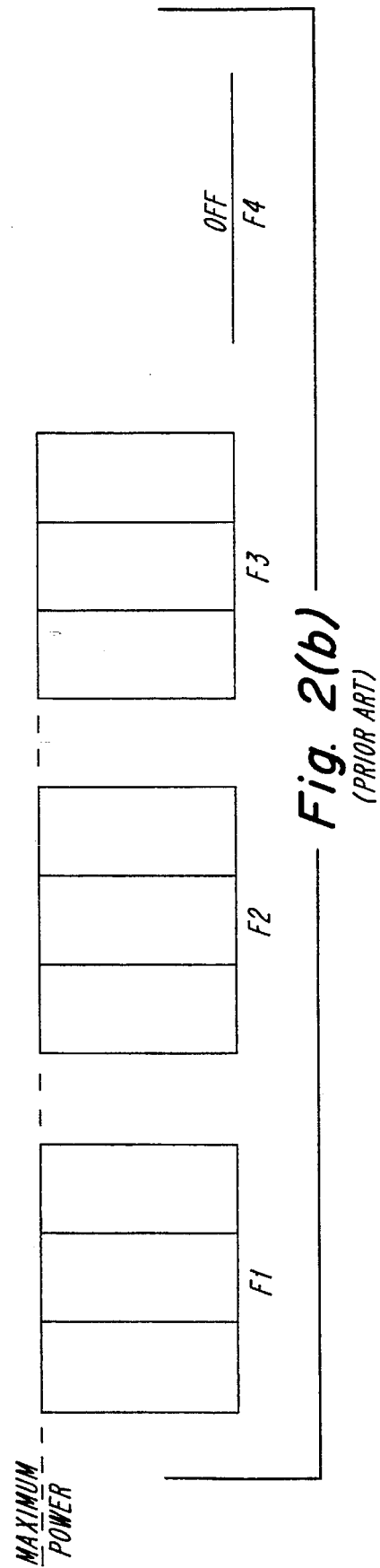
Fig. 2(a) (PRIOR ART)
Fig. 2(b) (PRIOR ART)

TIME AND FREQUENCY SLOT ALLOCATION SYSTEM AND METHOD

BACKGROUND

The user capacity of mobile radio communication systems is limited by the width of the frequency spectrum available for signal transmission. In order to maximize a system's capacity, therefore, it is desirable to utilize the available frequency band in the most efficient manner possible.

Cellular telephone systems in operation today commonly use an access technique known as Frequency Division Multiple Access (FDMA) to permit a base station to communicate with a plurality of mobile stations. In FDMA systems, each communication link is allocated a unique frequency slot of channel in the radio spectrum.

Newer systems use Time Division Multiple Access (TDMA), in which a base station communicates with a plurality of mobiles on the same frequency channel by dividing up a time cycle into time slots. The European GSM standard is an example of a system using FDMA and TDMA to allocate both frequency and time slots to mobile calls. The system uses 200 KHz wide frequency slots in each of which a 4.6 mS transmission cycle is divided into eight, 560 uS time slots, with short guard periods between each.

The guard periods in GSM are provided because base station transmission during a time cycle is not held at a constant power for all time slots, but instead changes the power level for each time slot based on the distance of the mobile station using that time slot from the base station. Moreover, for transmissions which employ frequency hopping, wherein the frequency channel employed for each 4.6 mS time cycle changes, a guard period of zero transmission power is provided whenever power or frequency is changed discontinuously to avoid spectral splatter into other frequency channels.

Another example of a system employing both TDMA and FDMA is the US Telecommunications Industry Association standard IS54. The IS54 standard describes a system having 30 KHz wide time slots, in each of which a base station employs a 20 mS transmission cycle divided into three, 6.6 mS time slots with no guard period between. The base station transmission in this system is actually just a continuous transmission of time-multiplexed data to three mobile stations. There is no guard period provided in TIA IS54 because frequency hopping is not employed, on the contrary, the system anticipates that the power level will be the same in all time slots.

U.S. Pat. No. 4,866,710 to Schaeffer describes a method of allocating frequencies and time slots to mobile stations such that all the time slots on a given frequency are filled first before allocating time slots on another frequency. By packing mobile stations preferentially in this way, the transmitters and frequencies that have not as yet allocated time slots can be switched off completely, reducing interference. This would reduce wasted capacity in the IS54 system arising from the requirement that base stations continually transmit on all three time slots even when only one is needed. However, it will be noted that the base station still transmits at one maximum power level for each frequency in use, irrespective of the power needs of each particular mobile, resulting in a higher net level of interference than if the power needs of each mobile were taken into account.

SUMMARY

Accordingly, it is an object of the present invention to achieve reduction of interference by a more effective strategy that works even when all time slots are filled. Exemplary methods according to the present invention allocate mobile stations to time slots on the same frequency as other mobile stations requiring similar base station transmitter power levels. In this way, mobiles which are allocated time slots on a given frequency channel will likely lie at similar distances from the base station. The base station transmitter power can then be chosen to be just sufficient for the mobile station on that frequency that needs the greatest power level. This provides a greater power margin than needed for the other mobiles on that frequency, but nevertheless allows a lower base station power than if mobiles had been allocated time slots and frequencies without regard to power needs. Thus, each frequency channel will serve a group of mobiles with similar base power transmission needs, and the base power can be correspondingly reduced on each frequency channel so as to be just sufficient for good signal transmission for the group. The cumulative reductions in power on every channel, therefore, will significantly reduce interference in the system.

According to an exemplary embodiment of the present invention, when the first mobile link with a given base is set up, the base chooses a frequency and time slot containing minimum interference. Commands are then issued to the mobile station to adjust its power level to a level sufficient for good received signal quality at the base. The mobile station in turn reports signal strength or quality received from the base station and the base station chooses a power level sufficient to provide good signal quality at the mobile.

When a second mobile link with the same base is set up, the base estimates the power level to be transmitted to that mobile and allocates to the second mobile another time slot on the same frequency if the power level to be transmitted is close to that used for the first mobile. If the required power level is slightly higher than that for the first mobile, the base smoothly increases the power transmitted to the higher level. If the second mobile requires a power sufficiently lower than the first mobile, it is allocated a time slot on a second frequency. The base then adapts its power and commands the mobile power to appropriate levels to maintain adequate signal quality in both directions.

According to exemplary embodiments, when a new mobile link is to be established with a base station already having a plurality of ongoing communications, the base station first estimates the power level that is appropriate for transmitting to that mobile. This is compared to the power level of all ongoing transmissions on frequencies that have at least one empty time slot. The mobile is then allocated a time slot on that frequency where the transmission power is greater than but closest to the estimated power. If no existing transmitter is of high enough power, the highest power transmission is smoothly increased to the estimated requirement for the new mobile, and the new mobile allocated an unused time slot on that frequency.

BRIEF DESCRIPTION OF THE DRAWINGS

The foregoing, and other, objects, features and advantages of the present invention will be more readily understood upon reading the following detailed description in conjunction with the drawings in which:

FIG. 1(a) shows an exemplary pattern of base station power requirements for each time slot on four frequencies;

FIG. 1(b) illustrates actual transmission power used by a conventional base station for each of the time slots of FIG. 1(a);

FIG. 2(a) shows a pattern of base station power requirements for a scheme in which all time slots on a given frequency are filled before allocating time slots on another frequency;

FIG. 2(b) illustrates actual transmission power used by a conventional base station for the time slots of FIG. 2(a);

DETAILED DESCRIPTION

In order to fully appreciate systems and methods according to the present invention, a more detailed description of conventional systems will first be provided.

FIGS. 1 and 2 illustrate conventional allocation schemes whereby the base station transmits at maximum power to the mobiles, irrespective of their power requirements. In FIG. 1 (a), mobiles are assigned frequencies (F1–F4) and time slots (Ts1–Ts3) essentially at random. Regardless of the power level required for each mobile, the base station transmits at the same maximum power level on all time slots as seen in FIG. 1(b). FIG. 2(a) illustrates allocating frequency and time slots to new mobiles so as to concentrate the mobiles on as few frequencies as possible in order to eliminate transmission on other frequencies. Note that all of the time slots on frequencies F1 and F2 and two of the three time slots on F3 have been filled. It can be seen in FIG. 2(b), however, that all base stations having at least one active time slot transmit at the same maximum power level according to this conventional scheme while those that have no active time slot are switched off. Moreover, neither conventional allocation scheme adjusts the power level transmitted by the base to be commensurate with that required by the mobiles.

Figure 3A:
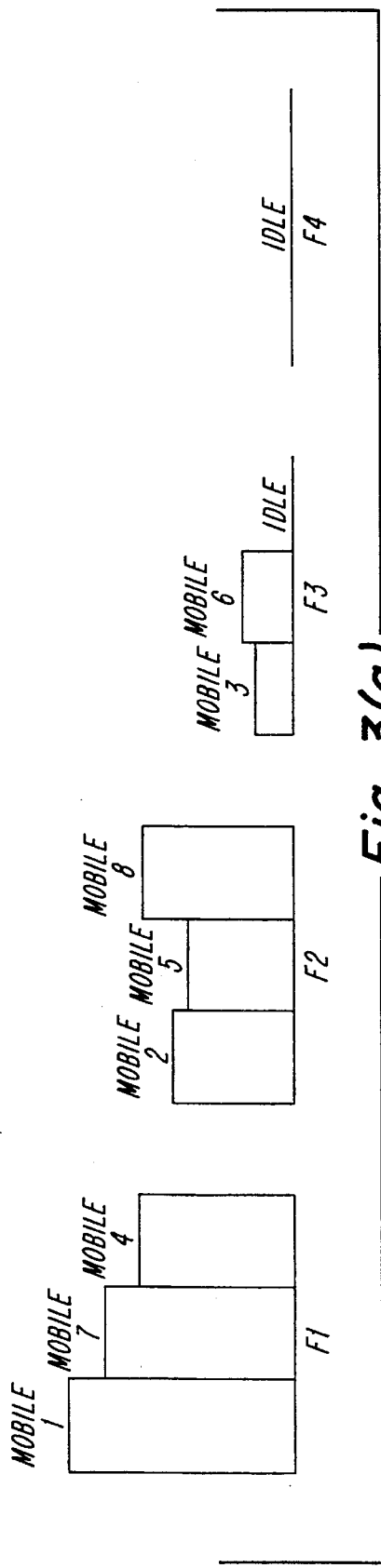
FIG. 3(a) shows an exemplary pattern of base station power profiles for mobiles which are allocated to time slots and frequencies according to the present invention.
Figure 3B:
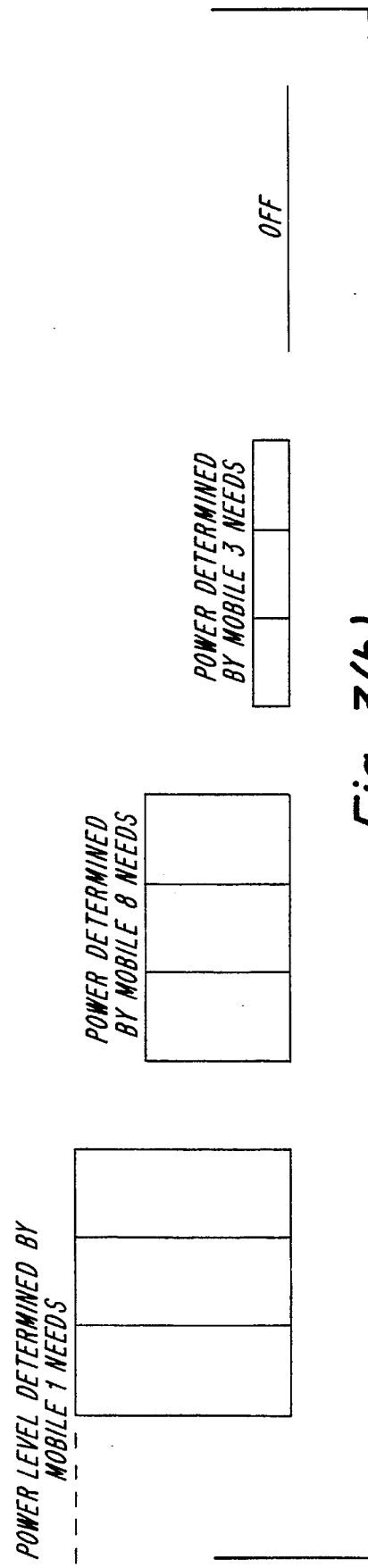
FIG. 3(b) illustrates base transmission power according to an exemplary embodiment of the present invention for the time slots illustrated in FIG. 3(a)

FIG. 3(a) shows mobiles having the same power requirements as used in FIGS. 1(a) and 2(a) being allocated to time slots (Ts) and frequencies (F) according to an exemplary embodiment of the present invention. Note that the three mobiles (1, 7 and 4) requiting the most power are allocated time slots on frequency F1, the next highest three mobiles (8, 2 and 5) are allocated on frequency F2 and the mobiles requiting the lowest base transmit power (6 and 3) are allocated to frequency F3, illustrating that many transmitters transmit at lower than maximum power while those that have no active time slots do not transmit at all. Although the number of transmitters which have been switched off (one) is the same as in FIG. 2(b), an additional benefit is obtained by operating those transmitters that are active at reduced power levels.

According to an exemplary embodiment of the present invention, when the first mobile link with a given base is set up, the base either chooses a frequency and time slot at random, or chooses the frequency and time slot containing minimum interference. Commands are issued to the mobile station over the air to adjust its power level to a level sufficient for good received signal quality at the base. According to one embodiment, this power level can be that which is just high enough to provide good received signal quality at the base. The mobile station reports signal strength or quality received from the base station and the base station chooses a power level sufficient to provide good signal quality at the mobile. Again, this power level may be that which is only just sufficient for this purpose.

When the second mobile link with the same base is set up, the base estimates the power level to be transmitted to that mobile and, if, for example, within the range 6 dB higher to 10 dB lower than that used for the first mobile, the base allocates to the second mobile another time slot on the same frequency as the first mobile, preferably the time slot containing the lowest level of interference. Note in this regard the similarity in power requirements for each mobile on each frequency channel F1, F2 and F3 in FIG. 3(a). If the required power for the second mobile link level is, for example, 0 to 6 dB higher than that for the first mobile, the base smoothly increases the power transmitted to the higher level. If the second mobile requires a power more than, for example, 10 dB lower, or 6 dB higher, than the first mobile, it is allocated a time slot on a second frequency, preferably the time slot which contains the minimum level of interference. The base then adapts its power and commands the mobile power to appropriate levels to just maintain adequate signal quality in both directions, as before.

When the third mobile link with the same base is set up, the base estimates the power it will need to transmit to the third mobile. Assuming the first two mobiles are already using the same frequency, if the third mobile requirement is within the range of, for example, 12 dB greater than the weaker of the first two mobiles to 12 dB lower than the stronger of the first two mobiles, the third mobile is allocated another time slot on the same frequency and power levels are adapted appropriately as before. Otherwise, the third mobile is allocated a time slot on another frequency, preferably that having the lowest level of interference.

When a new mobile link is to be established with a base station already having a plurality of ongoing communications, the base station first estimates the power level that is appropriate for transmitting to that mobile. This is compared to the power level of all ongoing transmissions on frequencies that have at least one empty time slot. The mobile is then allocated a time slot on that frequency for which the transmit power is greater than but closest to the estimated power. If no existing transmitter is of high enough power, the highest power transmission is smoothly increased to the estimated requirement for the new mobile, and the new mobile allocated an unused time slot on that frequency, preferably that containing the least interference. The transmit power levels are then adjusted appropriately as before. Similarly, the transmission power can be ramped down for frequencies in which a highest power time slot becomes idle after a connection serviced on that time slot becomes disconnected.

Figure 4:
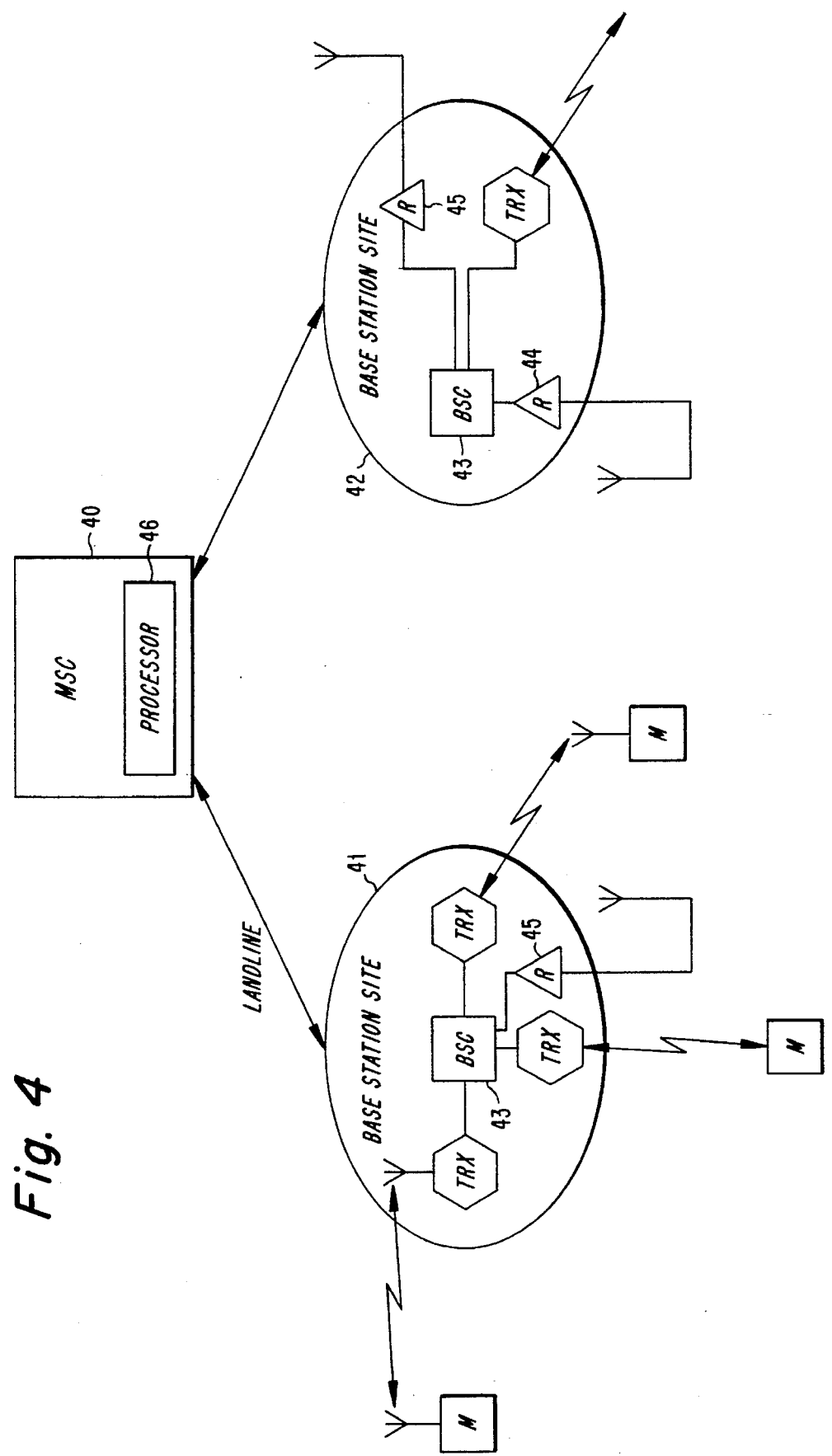
FIG. 4 shows an exemplary network block diagram according to the present invention.

FIG. 4 shows an exemplary network block diagram according to the present invention. A mobile switching center (MSC) 40 is connected by landline or other communication links to a number of base station sites referenced by numerals 41,42. Each base station site contains a number of TDMA transmitters, receivers and antennas for communicating with mobile stations M. The operating frequencies of each transmitter and receiver may be fixed according to a so-called cell plan or frequency-reuse pattern, but are preferably programmable to any channel in the allocated frequency band. The base station site may also contain a base station controller 43. The optional base station controller can be provided when it is desired to separate the intelligence for implementing the current invention from those functions normally performed by the MSC. When the MSC 40 is able to perform the functions required, the base station controller 43 may simply be a concentrator to funnel communications between the transceivers and the MSC.

As a further option, an interference assessment receiver 44 can be used to provide information via the base station controller to assist in the allocation of frequency and time slots to mobiles. The interference assessment receiver can be a scanning receiver, spectrum analyzer or multichannel device adapted to determine the interference energy levels in each of the presently unused frequencies and time slots at that base station site. This can be supplemented by measurements from the traffic receivers in unused time slots on their own frequencies.

The base station normally also contains a calling channel transmitter and random access receiver 45. The calling channel transmitter broadcasts information about the status of the base station to mobiles that may wish to establish communication. The random access receiver receives transmission from mobiles attempting to establish communication, before a traffic channel is allocated to the mobile according to this exemplary embodiment of the present invention. In the IS54 system, the calling channel is presently a non-TDMA transmission employing continuous transmission on a special frequency. The random access receiver operates on a corresponding frequency 45 MHz lower. Calling channel broadcasts and random access take place using Manchester code frequency modulated data transmission as in the US AMPS cellular system. At a later date it is probable that a TDMA calling channel will be introduced, together with a TDMA random access channel. If the TDMA calling channel uses, for example, only one out of three time slots while traffic is transmitted in the other two, then traffic requiring full power should be assigned to the remaining time slots on the calling channel frequency which typically requires full power.

It will be appreciated that the functions of the MSC and the base station controller as described above can be implemented conveniently with the aid of one or more microprocessors or computers and appropriate software e.g., processor 46 in FIG. 4. The processor or computer receives data messages transmitted by mobile stations requesting call set up or, for already existing communications, reporting signal strength or quality levels received from the base station. The computer or processor also receives data from the base station receivers which provides information pertaining to the signal strength or quality received from the mobiles, as well as interference levels in unused time slots.

According to this exemplary embodiment of the present invention, the computer processes this data to determine an appropriate frequency and time slot for communicating with a given mobile station, and sends control signals to the chosen base station transmitter-receiver so that it expects the mobile signal. The computer generates a message for transmission to the mobile to command it to operate in the chosen frequency and time slot. Messages are also generated for transmission to the mobile to command it to adjust its power level according to the received signal strength or quality at the base station receiver. Similar control signals are also sent to the base station transmitter so as to control its power level to be, for example, the minimum necessary to maintain signal quality as reported by the mobile on that frequency receiving the lowest quality. Alternatively, the power level can be selected to be some margin higher than this minimum necessary power.

When a base station maintains a large number of ongoing conversations with a multiplicity of mobile stations, there can arise reasons to change the frequency and timeslot allocations between mobile stations even when no old calls are terminating and no new calls are being initiated. Due to mobile motion, a mobile previously requiring high power may now be satisfied by lower base station power or vice versa. A simple systematic means to reshuffle frequency and timeslot allocations is for the network to maintain a list of ongoing conversations sorted by order of signal strength received from the mobiles, or, more accurately, sorted in order of radio propagation loss between the base station and the mobiles. The radio propagation loss may be computed from a knowledge of the received signal strength and the power level the mobile was previously commanded to adopt. A second check on this value may be computed from a knowledge of the signal quality reported back by the mobile and the transmitter power the network is transmitting to it. All such information may be utilized and averaged over a period of a few seconds to obtain a smoothed estimate of propagation loss.

Using the sorted list, the network ensures to the best of its ability that the top three mobiles on the list are allocated timeslots on the highest power carrier frequency; the next three mobiles in the list are allocated timeslots on the next strongest carrier frequency and so forth. If a Digital Control Channel is in use and transmitted on the strongest carrier, then the top two mobiles in the list are allocated the same carrier, the next three the second strongest carrier and so-on. The network may, if required, swap two mobiles between two carriers to achieve this. For example, if the highest power mobile X on carrier B due to relative movement now has a higher power requirement than the lowest power mobile Y on a stronger carrier A, then X and Y are caused to change frequency and timeslot allocations by issuing them with hand-off commands. Such hand-offs within the same base station area are called "internal handovers", and are made purely to achieve a more optimum frequency/timeslot packing that minimizes created interference with neighboring bases.

It has already been indicated above that an exception to the packing rule may be desirable if there is a large dB difference (e.g., >10 dB) between the carrier power and that needed by a mobile next on the list. It may be desirable to allocate that mobile to a lower power carrier together with the next two mobiles below it in the list. This results in an apparently unnecessary higher power transmission on a timeslot that is not allocated, but this departure from the absolute tightest packing algorithm has the advantage that a few unoccupied timeslots are distributed throughout the signal strength range and are thus available for allocating to new calls without having first to disturb a large number of ongoing conversations. It can even be adopted as a deliberate strategy, to leave a "hole" every 15 dB or so of propagation loss range, depending on the loading of the system, in order more rapidly to be able to accommodate new calls. If because of this coarse power step between "holes", a mobile has to be allocated to a "hole" on a carrier that is unnecessary, this will be corrected by the systematic resorting procedure that takes place on a slower timescale. Such a continuous resorting procedure also handles the event of a mobile call terminating. In principle all mobiles below it in the power/propagation loss list can be moved up, resulting in the highest of three perhaps receiving an internal handover to the next highest power carrier. This does not however take place all at once necessarily but gradually. The rate of handovers can be restricted so that no mobile receives a handover more often than, for example, say once per ten seconds. If a mobile has received an internal handover or handoff within the last ten seconds for example, it is not allowed to be a candidate for a handoff until ten seconds have passed. When the strongest of three mobiles on the three timeslots on a given carrier terminates its call, the power of the carrier may of course be regulated down to the stronger of the two remaining, thus reducing created interference levels.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A radio communication system comprising:
   a plurality of frequencies for transmission of communication signals;
   a plurality of time slots on each frequency;
   a plurality of first stations which transmit and receive communication signals on the time slots; and
   at least one second station which assigns time slots on a first frequency to first stations which are to be communicated with by employing highest second station transmitter power levels and which assigns time slots on a second frequency to first stations which are to be communicated with by employing second station transmitter power levels which are lower than said highest second station transmitter power levels, wherein each time slot transmitted on said first frequency is transmitted at a higher power level than each time slot transmitted on said second frequency.

2. A radio communication system according to claim 1, further comprising:
   means for adjusting power transmitted by the at least one second station on each of said first and second frequencies to be a minimum power level necessary for communication with every first station on that same frequency.

3. A radio communication system according to claim 1, further comprising:
   means for turning off transmission on frequencies having all time slots presently unallocated to a first station.

4. A radio communication system comprising:
   a plurality of frequencies available for transmission of communication signals;
   a plurality of time slots on each frequency;
   a plurality of first stations which transmit and receive communication signals on the time slots; and
   at least one second station which sorts the first stations into groups requiring similar second station transmitting power and allocates a unique frequency to each group and a unique time slot to each first station in each group, whereby time slots allocated to a same frequency by said at least one second station are associated with a same second station transmitting power.

5. A radio communication system according to claim 4, further comprising:
   means for turning off transmission on frequencies having all time slots unallocated to a first station.

6. A radio communication system comprising:
   a plurality of frequencies available for transmission of communication signals;
   a plurality of time slots on each frequency, wherein times slots on a common frequency are associated with a common second station transmitting power;
   a plurality of first stations which transmit and receive communication signals on the time slots; and
   at least one said second station comprising:
   a plurality of transmitters and an antenna system for transmitting communication signals to the first stations;
   a plurality of receivers for receiving communication signals from the first stations;
   a calling channel transmitter for transmitting a channel assignment message to the first stations;
   a random access receiver for receiving a random access message from one of the first stations and for measuring a quality and a signal strength of the random access message;
   a station controller for i) receiving the random access message, random access message quality, and random access message signal strength from the random access receiver and for estimating a transmitting power necessary to communicate with one of the first stations based on the random access message, random access message quality, and random access message signal strength; for ii) selecting a frequency having an unallocated time slot for said one of said first stations based on the estimated transmitting power; for iii) composing a channel assignment message; and for iv) sending the channel assignment message to said one of said first stations via the calling channel transmitter.

7. A radio communication system according to claim 6, wherein the station controller further comprises means for adjusting a power level on a frequency having all time slots presently unallocated to the estimated transmitting power level for said one of said first stations.

8. A radio communication system according to claim 6, wherein the station controller further comprises means for selecting, as said frequency, a frequency on which the at least one second station is transmitting at a power greater than, but closest to, the estimated transmitting power for said one of said first stations.

9. A radio communication system according to claim 6, wherein the station controller further comprises means for selecting, as said frequency, a frequency having a highest transmitting power when the estimated transmitting power for said one of said first stations is greater than a transmitting power of every frequency on which said at least one second station is transmitting.

10. A radio communication system according to claim 9, wherein the station controller further comprises means for smoothly increasing the transmitting power of the frequency having the highest transmitting power to the estimated transmitting power for said one of said first stations.

11. A radio communication system according to claim 6, further comprising means for turning off transmitters which transmit on frequencies having all time slots presently unallocated to a first station.

12. The radio communication system according to claim 6, further comprising means for determining an interference level in each unallocated time slot on the selected frequency and assigning to said one of said first stations the time slot on the selected frequency having a lowest interference level.

13. A method for assigning time slots and frequencies in a radio communication system comprising the steps of:
   grouping together a first plurality of remote stations having a highest required base station transmission power;
   grouping together a second plurality of remote stations each of which has a lower required base station transmission power than any of said first plurality of remote stations;

allocating each of said first plurality of remote stations to a plurality of time slots on a first frequency, each of said times slots associated with said first frequency thereby being associated with said highest required base station transmission power; and allocating each of said second remote stations to a plurality of time slots on a second frequency, each of said time slots associated with said second frequency thereby being associated with said lower required base station transmission power.

14. The method of claim 13, further comprising the step of:

transmitting signals on said first frequency at a highest required power level of said first plurality of remote stations.

15. The method of claim 13, further comprising the step of:

transmitting on said second frequency at a highest required power level of said second plurality of remote stations.

16. The method of claim 13, further comprising the step of:

continuing to group additional remote stations based on their relative transmission power requirements.

17. The method of claim 13, further comprising the step of:

turning off frequencies which have no remote stations allocated thereto.

18. The method of claim 13, wherein said steps of allocating further comprise the step of:

allocating said time slots in said first and second frequencies based on anticipated interference.

19. A method of optimizing the allocation of time slots and frequencies for supporting two-way radio communication between a base station and a plurality of remote stations comprising:

sending commands from said base station to said remote stations to use a higher or lower transmission power level in order to maintain a desired signal quality at said base station;

continuously estimating path loss between each of said remote stations and said base station based on the strength of the signals communicated between said base and remote stations and commanded power level;

sorting said remote stations according to said path loss values into an ordered list; and grouping neighboring remote stations in said list to use time slots on the same frequency, wherein time slots sharing the same frequency are all associated with a same base station transmitting power.

20. The method according to claim 19 in which said base station uses a transmission power on each frequency that is sufficient for a remote station using that frequency having the highest path loss value.

21. The method according to claim 20 in which said transmission power is adjusted downwards upon termination of communication with the remote station having the highest path loss.

22. The method according to claim 19 in which dummy remote stations are inserted at intervals in said list in order to create a free timeslot/frequency combination for accepting new calls.

* * * * *